May 31, 1938.  W. I. SENGER  2,119,029

MACHINE TOOL HOLDER

Filed Sept. 30, 1935  2 Sheets-Sheet 1

INVENTOR
Werner Irving Senger
BY
Fred G. Parsons
ATTORNEY

May 31, 1938.  W. I. SENGER  2,119,029
MACHINE TOOL HOLDER
Filed Sept. 30, 1935  2 Sheets-Sheet 2

INVENTOR
Werner Irving Senger
BY Fred G Parsons
ATTORNEY

Patented May 31, 1938

2,119,029

UNITED STATES PATENT OFFICE 2,119,029

MACHINE TOOL HOLDER

Werner Irving Senger, Madison, Wis., assignor to Gisholt Machine Company, Madison, Wis., a corporation of Wisconsin Application September 30, 1935, Serial No. 42,848

10 Claims. (Cl. 29—49)

This invention relates to machine tools, and more particularly to improvements in locating and clamping means for indexible tool holders for lathes.

A purpose of the invention is to provide improved means for accurately locating indexible members, together with clamping means which will operate with improved effectiveness to rigidly hold the indexible member in indexed position, and will operate without disturbing the accuracy of the position defined by the locating means previous to the clamping.

A further purpose is to provide improved locating means operated into and out of locating position by the movements of the clamping means, and improved structure, both for locating and clamping, particularly adapted for such coaction.

A further purpose is to provide an improved indexible lathe tool post, including improved means for rigidly clamping a plurality of tools in positions for successive operations upon a work piece supported by the lathe spindle, and improved means for successively positioning the post and tools for such operations, and for rigidly clamping the tool post in each successive position.

A further purpose is to provide an improved structure for manually clamping and locating an indexible lathe tool post, in which the positions and movement of the manual operating elements is such as to be operated most conveniently and effectively by an operator when in his normal operating position, and with least danger to the operator from the moving elements of the lathe.

A further purpose is to provide an improved tool post indexing means of a form and construction to be used on the longitudinally movable cross slide of a lathe with minimum interference on the one hand with the chuck or work pieces carried by the lathe spindle and on the other hand with structure such as is required, for instance, by a longitudinally movable tool turret and with minimum interference with tools carried by such a turret.

A further purpose is generally to simplify and improve the construction and operation of means for locating and clamping indexible machine tool members and particularly for lathes, and especially for the indexible tool posts of lathes.

The invention consists of the structure herein illustrated, described, and claimed, and in such modifications of the structure illustrated and described as are equivalent to the structure claimed.

In the specification the same reference characters have been applied to the same parts throughout, and in the drawings.

Figure 1:
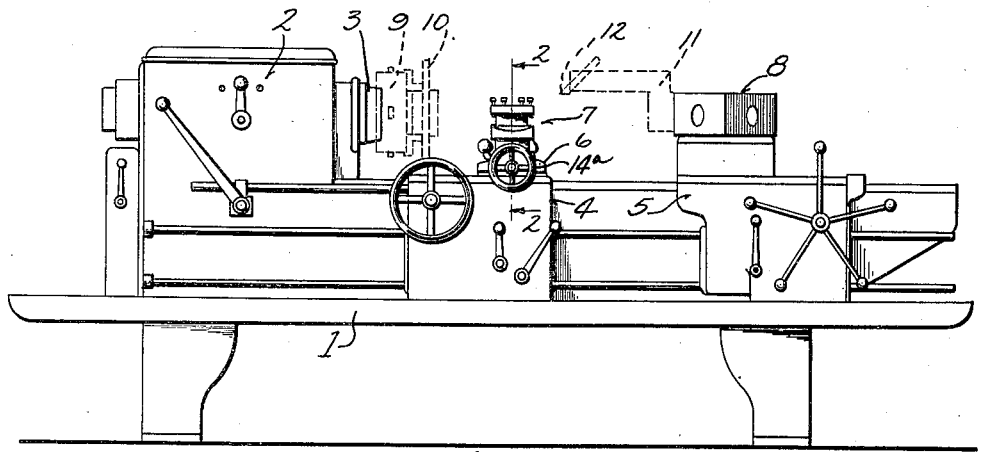
Fig. 1 is a front elevation of a lathe incorporating the invention.

The machine shown in Fig. 1 is a lathe which includes a bed 1, a headstock 2 providing transmission and control mechanism for a spindle 3 rotatably mounted therein, a cross slide carriage or support 4 and a turret carriage or support 5 each guided on bed 1 for movement parallel with the axis of the spindle 3. The carriage 4 guides a cross slide 6 upon which is mounted an indexible tool post generally denoted by the numeral 7 for movement transverse to the axis of spindle 2. The carriage 5 carries a turret device 8. Fixed on the carriage end of spindle 2 is a chuck or work holder 9 in which work pieces such as 10 may be removably clamped.

Turret tool holders such as 11, carrying tools such as 12 are frequently used in this type of lathe, and in order for tool 12 to operate on work piece 10 without undue overhanging and loss of rigidity both the carriages 4 and 5 must be moved to the left in Fig. 1 to a position where there is very little space available for slide 6 and tool post 7 between the chuck 9 and carriage 5. It is also evident that, unless tool post 7 is to be moved far to front or rear each time the tool 12 is brought forward into contact with the work piece, the tool post 7 must be kept sufficiently low for the turret tool 12 to pass over it to reach the work piece 10. Such considerations, and others, indicate that tool post 7 and its associated mechanism should be confined within a space as narrow as may be possible from left to right, Fig. 1, and to project as little as possible above the center of spindle 3.

Furthermore the safety of the operator requires that any operating devices for the post 7 shall not require the entry of the operator's hands into the zone to the left, in Fig. 1, of the slide 6 and tool post 7. Otherwise, since the tool post 7 during its operation is ordinarily brought close to the work piece 10 and chuck 9, in order to reduce tool overhang, the operator's hands might be caught and damaged by the revolving work or chuck.

In the machine here shown various defects of previous machines, in the matters just mentioned, and in other matters, have been overcome.

Figures 4, 5, 6:
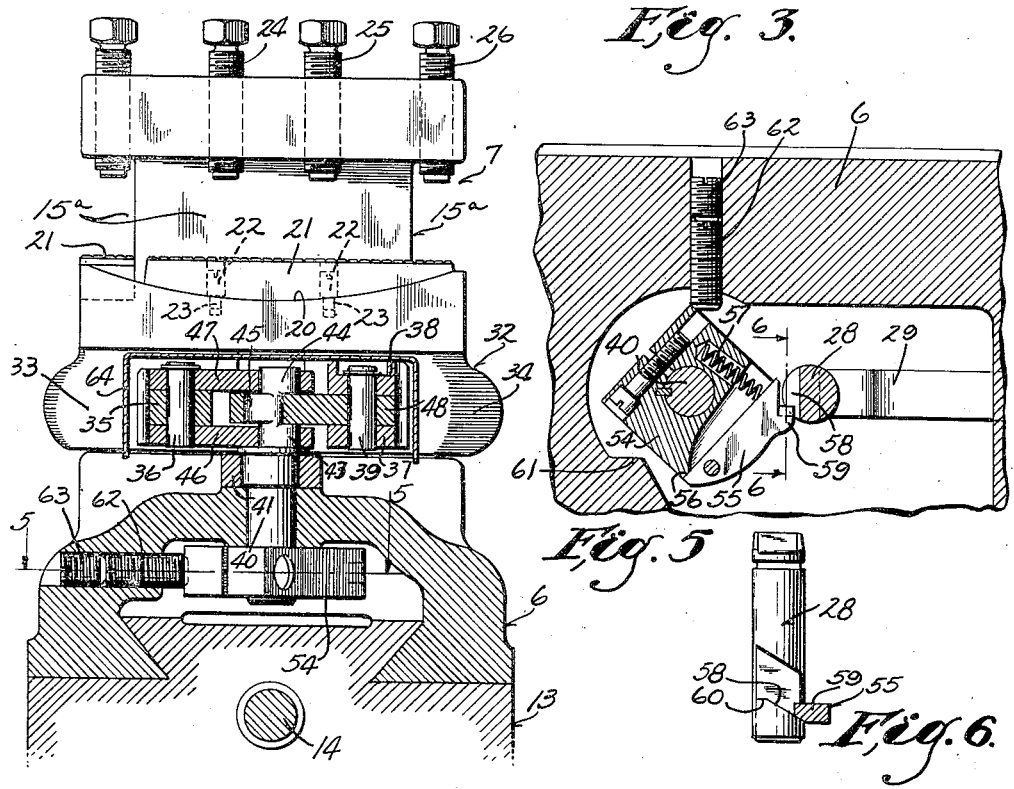
Fig. 4 is a vertical section taken approximately along line 4—4 of Fig. 3.
Fig. 5 is a partial horizontal section, taken approximately along line 5—5 of Fig. 4.
Fig. 6 shows an index locating plunger, shown in Figs. 3 and 5, and a portion of an operating latch therefor, viewed from the position 6—6 of Fig. 5.

The cross slide 6 is mounted on a portion 13, Fig. 4, of carriage 4, which bridges between front and rear carriage guides or slides on the bed, and the slide 6 is operated by the means of a screw 14, journaled in slide 6 and engaging a suitable nut, not shown, fixed with carriage 5, there being a hand wheel 14a, Fig. 1, fixed on screw 13 at the front of the carriage. Both the slide 6 and the bridge portion 13 are relatively narrow in the direction of the spindle axis, as shown in Fig. 4, for the reasons previously discussed.

Figure 2:
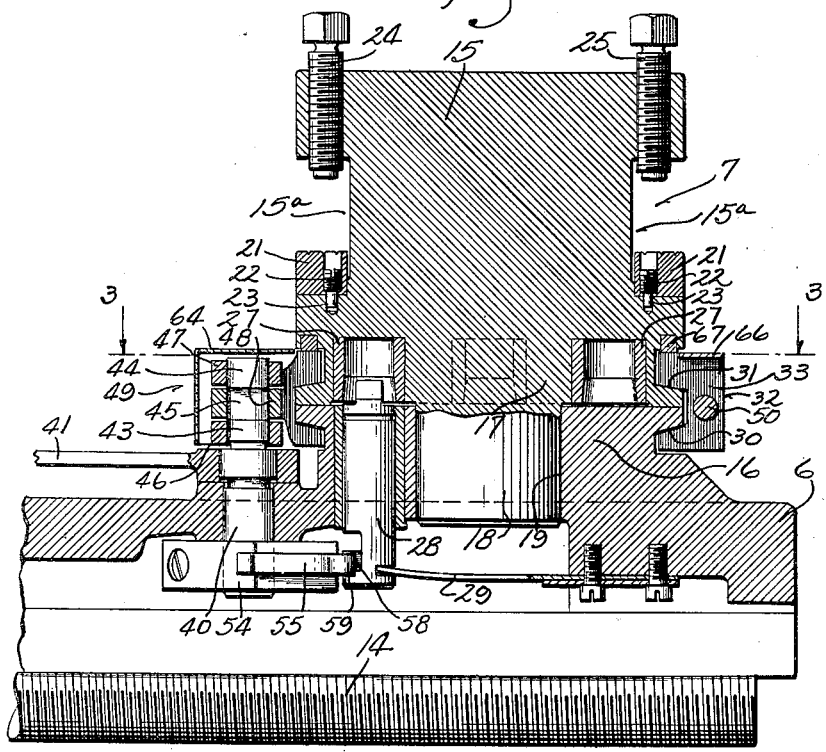
Fig. 2 is an enlarged transverse vertical section of the indexible tool post of the lathe shown in Fig. 1, and of a portion of its supports, taken approximately along the line 2—2 of Fig. 1.

The tool post 7 and its operating mechanism is carried by slide 6 for bodily movement therewith, and includes the following structure:

A block member 15 is mounted for rotation on slide 6, the slide providing an annular post support portion 16, Fig. 2, slightly elevated above the top surface of the slide, in supporting contact with a corresponding annular bottom portion 17 of block 15, the block providing a pivot pin portion 18 rotatably engaging a bore 19 in the slide 6, the bore and pin being co-axial with the annular supporting surfaces.

The block 15 provides a plurality of tool holding slots, in this instance four, each similar to the slot 15a, Figs. 2, 4, and each providing a bottom surface, such as 20, of circular segmental form, in which are supported tool rests such as 21, having screws such as 22, which may be advanced for the end of the screw to enter locating holes such as 23, whereby to locate the rests 21 with the top surface thereof in a horizontal plane. The screws 22 may also be retracted to permit the tool rests 21 to assume an angular position whereby to raise or lower the cutting point of a tool resting thereon. Associated with each of the slots 15a are three screws such as 24, 25, 26 for clamping suitable tools in the slots.

The tools, not shown, held in the different slots 15a are successively rotated with the block 15 into operating positions where the slot of the tool to be used is on the side adjacent spindle 2, and at right angles to the axis of the spindle. In each such position the block 15 must be very accurately located in order that successive work pieces shall not vary in size, and rigidly clamped to prevent chatter or vibration.

To locate block 15 there are provided locating bushings, such as 27, suitably spaced, and engageable by a plunger 28 normally urged in engaged direction by a spring 29, Fig. 2, of the flat or cantilever type. The plunger 28 is movable for disengagement by means later described.

To clamp block 15 in the various positions of rotation determined by plunger 28 clamp means are provided as follows:

The annular portions 16, 17 are respectively provided with annular clamp surfaces 30, 31, Fig. 2. Both these surfaces are simultaneously engageable by surfaces complementary thereto on a clamp ring device generally denoted by the numeral 32, and which includes a plurality of members or portions 33, 34, Fig. 3.

The surfaces 30, 31 and the complementary surfaces of ring 32 are formed to co-operate to force the block 15 downward against the face of slide portion 16 when the split ends of the ring 32 are forced together to contract the ring diameter, and to release the block for rotation when the ring is expanded.

The ring 32 is split at the side in the direction of the hand wheel 14a at the front of the machine, and the ring member 33, at its split end, has fixed thereon a lug 35 carrying a pivot pin 36. The ring member 34 similarly has fixed thereon a plurality of spaced lugs 37, 38 carrying a pivot pin 39.

Figure 3:
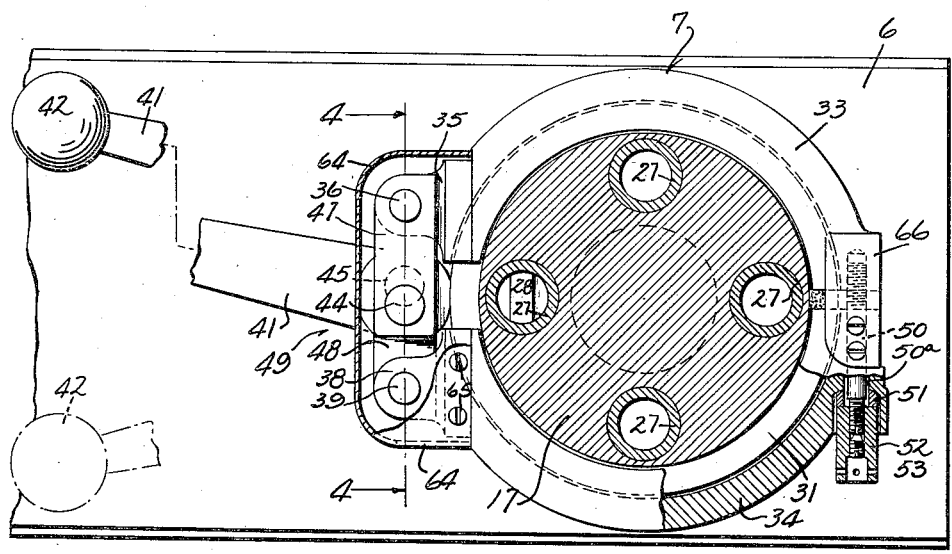
Fig. 3 is a partial horizontal section taken approximately along line 3—3 of Fig. 2.

A vertical shaft 40 has fixed thereon a manually operable lever 41 having a hand grip portion 42 which swings about the shaft axis, and the shaft is provided at its upper end with two spaced co-axial portions 43, 44 each correspondingly eccentric to the axis of shaft 40, as indicated in Fig. 3, and with an intermediate portion 45 similarly but oppositely eccentric to the shaft axis. The co-axial eccentric portions 43, 44 are pivotally engaged by the one end of links 46, 47 which at the other end engage the pivot pin 36. The eccentric portion 45 pivotally engages one end of a link 48, which at the other end engages the pivot pin 39.

The described arrangement, including the eccentrics and links provides a very powerful toggle device generally denoted by numeral 49, Fig. 3, operative in the one direction of rotation of hand grip 42 about the axis of shaft 40, to separate the split ends of ring 32, whereby to expand the ring to permit the block 15 to be turned about the axis of pin 18, and operative in the other direction of rotation of hand grip 42 to force the block downwardly and rigidly hold it against the annular face of the slide 6.

To alter the effective diameter of ring 32, in order that the toggle clamping device 49 may clamp at the most effective position of the toggle members, and for other reasons, the two members 33, 34 of ring 32 are relatively adjustable by the means of a stud 50, fixed in the ring member 33 and extending through a bore 50a in member 34, the stud carrying a washer 51 having a self-aligning seat on member 34 and adjustable by an elongated nut 52 threaded on the stud 50. The threads of the nut 52 carry a screw 53, which may be set up against the end of the stud 50 to lock the adjustment.

The lower end of shaft 40 carries means for operating the locating plunger 28, as follows: A member 54 is fixed on the shaft and carries a pivoted latch member 55 normally urged against a locating abutment 56 by a spring 57. The plunger 28 is provided with a cam slot 58, Fig. 6, which is engaged by an end portion 59 of the latch. In the clamping position of lever 41, which is the full line position of Fig. 3 the plunger and its operating parts are positioned as shown in Figs. 5, 6. As lever 41 is turned toward the dotted line position, Fig. 3, whereby to unclamp the block 15, the cam portion 59 causes disengagement of the plunger 28 from bushing 27 against the resistance of spring 29, until the lower face of cam portion 59 rides on a locating portion 60 of plunger 28, which establishes the disengaged plunger position.

The described plunger disengagement is completed after the block 15 is fully unclamped, but before the lever 41 has completed its movement in unlocking direction, the block 15 meanwhile being urged, manually in this instance, in the direction of rotation which will locate the block in the new position desired. As soon as the plunger is withdrawn from the locating bushing the block rotates sufficiently that the plunger cannot reenter the bushing from which it disengaged and a further movement of lever 41 in unclamping direction brings the latch carrier member 54 against an abutment 61, Fig. 5, fixed on slide 6, the hand lever 41 then being in the dotted line position of Fig. 3. In this position the cam portion 59 has passed completely through cam slot 58 and the plunger 28 is moved upwardly by the spring 29, whereby it enters another locating bushing 27 as soon as block 15 has rotated to the desired position.

When plunger 28 has entered the bushing 27 in the new position, as described, the hand lever 41 may be returned to block clamping position and during this return movement the latch 55 pivots against the resistance of spring 57 to permit the portion 59 to pass plunger 28 in its return to the position shown in Fig. 5.

The fixed abutment 61 limits the movement of lever 41 in the unclamping direction to prevent the hand grip position 42 from passing the right hand edge, Fig. 4, of the slide 6 and the carriage bridge portion 13.

Means are provided for the clamping direction of movement to prevent the toggle 48 from passing through clamping position, consisting of adjustable abutment screw 62, Fig. 5, which contacts the member 54, as there shown. Abutment screw 62 may be exposed for adjustment by removing a locking screw 63. Abutment screw 62 also prevents the hand grip 42 from passing the forward edge of slide 6 and bridge 13, if the toggle adjustment fails to act as a limit stop.

A cover 64 is provided to protect the toggle device 48 from chips or other foreign matter, the cover being removably held in position by screws such as 65. A removable cover 66 similarly protects the slot or space provided at the rear for the adjustment of members 33, 34. The covers extend somewhat underneath the edge of the narrowest portion of block 15, as shown in Fig. 2, and to further protect the opposed relatively movable surfaces of block 15, slide 6 and clamp ring 32 against entry of chips or abrasive substances there is provided a ring 67, Fig. 2 of resilient packing material located in an annular groove in block 15 and bearing against the upper surface of ring 32.

What is claimed is:

1. In a lathe, the combination of a bed, a carriage guided on said bed for horizontal reciprocation, a work spindle rotatably supported at one end of said bed and axially parallel to the path of carriage movement, a slide guided on said carriage for horizontal reciprocatory movement in a direction transverse to the direction of carriage movement and having an edge in the direction of said spindle and substantially parallel with the movement of said slide, a tool holder supported on said slide for rotary index movement to different positions about a vertical axis, means for accurately defining different of said tool holder positions including a locating member carried by said slide and movable into positions respectively engaging and disengaging said tool holder, a lever pivotally carried by said slide and providing a hand grip portion movable in a substantially horizontal plane in directions toward and from said spindle, clamp means operable for releasably fixing said tool holder rigidly with said slide, motion transmitting connections from said lever both for the movement of said locating member and for operation of said clamp means, and means limiting the movement of said lever to prevent movement of the hand grip portion thereof to the spindle side of a vertical plane coinciding with said edge.

2. In a lathe, the combination of a bed, a carriage guided on said bed for horizontal reciprocation, a work spindle rotatably supported at one end of said bed and axially parallel to the path of carriage movement, a slide guided on said carriage for horizontal reciprocatory movement in a direction transverse to the direction of carriage movement and having an edge in the direction of said spindle substantially parallel with the path of movement of the slide, a tool holder supported on said slide for rotary index movement to different positions about a vertical axis, means for accurately defining different of said tool holder positions, a lever pivotally carried by said slide and providing a hand grip portion movable in a substantially horizontal plane in directions toward and from said spindle, clamp means operable for releasably fixing said tool holder rigidly with said slide, a motion transmitting connection from said lever for operation of said clamp means, and means limiting the movement of said lever to prevent movement of the hand grip portion thereof to the spindle side of a vertical plane coinciding with said edge.

3. In a lathe the combination of a bed, a horizontal spindle rotatably supported from said bed, said bed providing ways at an upper level thereof, a carriage guided on said ways for horizontal reciprocatory movement parallel to the axis of said spindle and providing a bridge portion extending above said ways and having substantially parallel edges respectively defined by different planes each substantially vertical to the spindle axis and spaced apart in the direction of carriage movement, a slide guided on said carriage for horizontal reciprocatory movement in a path substantially vertical to the spindle axis, a tool holder supported on said slide for rotary index movement to different positions about a vertical axis, means for accurately locating different of said tool holder positions including a member carried by said slide and movable into positions respectively engaging and disengaged from said tool holder, clamp means operable for releasably fixing said tool holder rigidly with said slide, a lever carried by said slide for movement about a substantially vertical axis and in a plane at a level underneath the axis of said spindle, said lever including a hand grip portion movable toward and from said spindle between said planes, a motion transmitting connection from said lever to said clamp means, and means restricting the movement of said lever to prevent movement of said hand grip portion in either portion through either of said planes.

4. In a lathe the combination of a bed, a horizontal spindle rotatably supported from said bed, said bed providing ways at an upper level thereof, a carriage guided on said ways for horizontal reciprocatory movement in the direction of said spindle axis and providing a bridge portion extending above said ways and having substantially parallel edges respectively defined by different planes each substantially vertical to the spindle axis and spaced apart in the direction of carriage movement, a slide guided on said carriage for horizontal reciprocatory movement substantially at right angles to the carriage movement, a tool holder supported on said slide for rotary index movement to different positions about a vertical axis, means for accurately locating different of said tool holder positions including a member carried by said slide and movable into positions respectively engaging and disengaged from said tool holder, clamp means operable for releasably fixing said tool holder rigidly with said slide, a lever carried by said slide for movement about a substantially vertical axis and in a plane at a level underneath the axis of said spindle, said lever including a hand grip portion movable toward and from said spindle between said planes, motion transmitting connections from said lever and respectively connected for movement of said member and for operation of said clamp means, and means restricting the movement of said lever to prevent movement of said hand grip portion to the spindle side of the one of said planes nearest the spindle.

5. In a lathe the combination of a bed, a carriage guided on said bed for horizontal reciprocation, a work spindle rotatably supported at one end of said bed and axially parallel to the path of carriage movement, a tool holder supported from said carriage for rotary index movements about a vertical axis and including a block member having a plurality of side faces, different of said faces each providing a laterally open substantially horizontal tool receiving slot, a slide guided on said carriage for movement in a direction transverse to the carriage movement and having an edge in the direction of said spindle substantially vertical to the spindle axis, said tool holder being carried by said slide for unitary bodily movement therewith, clamp means wholly underneath said tool slots and movable to different positions respectively for releasing said tool holder for index rotation and for clamping said tool holder rigidly with said slide, locating means for defining successive positions of said tool holder in which the different tool carrying slots are successively nearest the spindle, said locating means including a plunger vertically movable into and out of locating engagement with said tool holder in each of said successive positions, a hand lever pivoted on said slide and providing a hand grip portion movable toward and from said spindle, a motion transmitting connection from said hand lever to effect the different positions of said clamp means respectively from the different directions of movement of said lever, and another motion transmitting connection from said lever for effecting the disengaged position of said plunger during lever movement in the direction effecting the position of said clamp means releasing said tool holder, the last mentioned connection being adapted to free said plunger for tool holder engagement during continued movement of said lever in the last mentioned direction, and means limiting the movement of said lever to prevent movement of said hand grip portion to the spindle side of the vertical plane coinciding with said edge.

6. In a lathe the combination of a bed, a carriage guided on said bed for horizontal reciprocation, a work spindle rotatably supported at one end of said bed and axially parallel to the path of carriage movement, an indexible tool holder including a block member having a plurality of side faces, different of said faces each providing laterally open substantially horizontal tool receiving slots, a slide guided on said carriage for movement in a direction substantially vertical to the spindle axis and having an edge in the direction of said spindle substantially parallel to the slide movement, a means for movement of said slide including a hand wheel adjacent the one end thereof and rotatable on an axis parallel with the path of slide movement, said tool holder being carried by said slide adjacent the other end thereof for unitary bodily movement therewith, a clamp means movable to different positions respectively for releasing said tool holder for index movement and for clamping the tool holder rigidly with said slide, locating means for indexing said tool holder to different positions wherein different of said tool slots are respectively turned to be nearest the spindle, said locating means including a member movable into and out of engagement with said tool holder in each of said positions, means continuously urging said locating member toward engagement, a hand grip member horizontally movable toward and from said spindle and positioned above said slide in the space between said hand wheel and said tool holder, a motion transmitting connection from said hand grip member for the opposite directions of movement thereof respectively to effect said different positions of said clamp means, another motion transmitting connection from said hand grip member for moving said locating member to disengaged position during a first portion of the direction of hand grip member movement in the direction to effect unclamping, the last mentioned connection being adapted to free said locating member for tool holder engagement during a later portion of hand grip member movement in the last mentioned direction, and means limiting the movement of said hand grip member to prevent movement thereof to the spindle side of a vertical plane coinciding with said edge.

7. In a machine tool, the combination of an indexable turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, means for oscillation of said shaft, a cam follower member carried by said shaft to engage said groove and cooperate therewith to withdraw said plunger during oscillation of said shaft in the one direction, and means yieldably mounting said follower member to pass the plunger without plunger movement during shaft oscillation in the other direction.

8. In a machine tool, the combination of an indexable turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexable turret, and means connecting said shaft for operation of said clamp means.

9. In a machine tool, the combination of an indexable turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexable turret, and means connecting said shaft and clamp means for releasing said indexable turret during oscillation of said shaft in the direction first mentioned and for clamping said turret during shaft oscillation in said other direction.

10. In a machine tool, the combination of an indexable turret, a locating plunger reciprocable in a direction parallel with the turret axis, said turret providing spaced sockets, respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexable turret, means connecting said shaft for operation of said clamp means, said lever providing an exposed hand grip portion, and means limiting the oscillation of said shaft whereby to limit the movement of said hand grip portion to prevent movement thereof outside the space defined between two spaced planes each parallel with the turret axis and respectively coinciding with opposite edges of said turret.

WERNER IRVING SENGER.

CERTIFICATE OF CORRECTION.

Patent No. 2,119,029.                                                May 31, 1938.

WERNER IRVING SENGER.

It is hereby certified that error appears in the printed specification of the above numbered patent requiring correction as follows: Page 3, second column, line 57, claim 3, for the word "portion" read direction; and that the said Letters Patent should be read with this correction therein that the same may conform to the record of the case in the Patent Office.

Signed and sealed this 12th day of July, A. D. 1938.

(Seal)

Henry Van Arsdale,
Acting Commissioner of Patents.